United States Patent [19]

Doiron

[11] 4,375,284
[45] Mar. 1, 1983

[54] FLY TIERS' VISE

[76] Inventor: Gerald J. Doiron, P.O. Box 277, Harwichport, Mass. 02646

[21] Appl. No.: 269,994

[22] Filed: Jun. 3, 1981

[51] Int. Cl.³ .............................................. B25B 1/08
[52] U.S. Cl. .................................... 269/236; 269/237; 269/270; 269/907; 269/254 R
[58] Field of Search ............ 269/254 R, 254 CS, 239, 269/236, 235, 233, 237, 3, 6, 129, 157, 158, 269, 270, 907; 81/6, DIG. 6, 425–427; 24/248 R, 248 E, 252 R, 252 B

[56] References Cited

U.S. PATENT DOCUMENTS

| 588,209 | 8/1897 | Yocum | 269/254 R |
|---|---|---|---|
| 1,545,574 | 7/1925 | Rollins | 269/239 |
| 1,809,774 | 6/1931 | Coates | 269/239 |
| 2,077,468 | 4/1937 | Fausek et al. | 269/157 |
| 2,082,653 | 6/1937 | Rawson | 269/270 |
| 2,563,267 | 8/1951 | Petersen | 81/425 R |
| 2,569,424 | 9/1951 | Mayhew et al. | 269/239 X |
| 3,066,930 | 12/1962 | Chinnick | 269/71 |
| 3,353,819 | 11/1967 | Palmer | 289/254 |

Primary Examiner—Robert C. Watson
Attorney, Agent, or Firm—Charles R. Fay

[57] ABSTRACT

A fly tying device including relatively heavy resilient steel bars which are provided with a supportive means and also concave edges which face each other to space the bars for a major portion of the length thereof together with a cam to temporarily spread the free ends of the bars apart to accept the hook.

9 Claims, 7 Drawing Figures

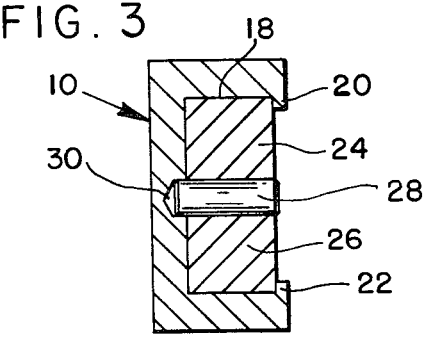
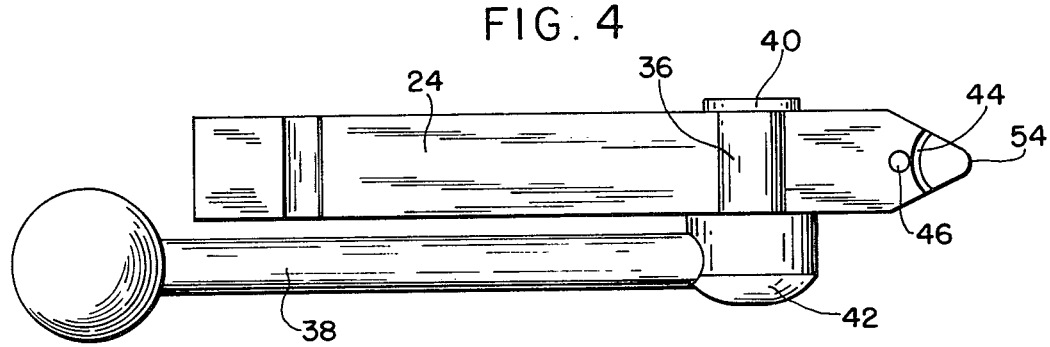
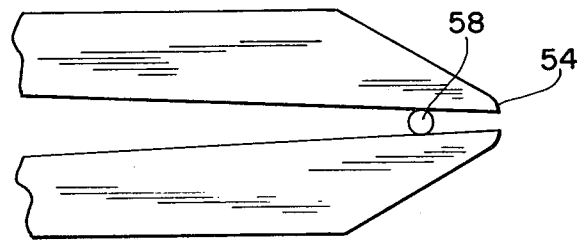
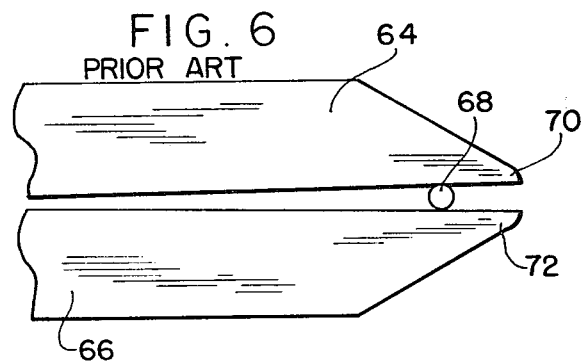
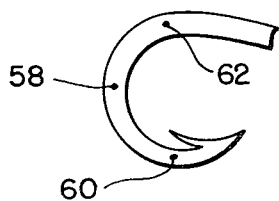

FLY TIERS' VISE

BACKGROUND OF THE INVENTION

There have been many fly tier's vises suggested, manufactured and used, but as far as applicant is aware they all have one or more deficiencies, particularly in the area of the acceptance of different sizes of hooks, and ease and convenience of adjustment, both for this purpose and also in the area of clamping ability and bodily vise adjustment.

It is the principal object of the present invention to provide a new and improved fly tier's vise which is more versatile in these respects, being adapted to hold hooks of widely varying sizes without any adjustments and to place the clamped hook in the most convenient position for making the fly.

SUMMARY OF THE INVENTION

A fly tier's vise comprising a support, a pair of inherently resilient relatively elongated steel bars which are actually bent slightly to provide each with a concave edge, the edges facing each other so that the bars are normally spaced apart for the greatest portion of their length, being held together in a pressure relationship at the inner non-operative ends held in the support and gradually diverging and then converging, coming substantially together at the free ends of the bars which are the jaws for holding a hook while the fly is being tied. A cam is used for spacing the jaws to accept the hook and the cam provides a pressure point for holding the jaws themselves at their extreme ends with a very slight gap in the order of three thousandths of an inch. Also there is an arcuate groove in one jaw only, to help in holding larger hooks, together with a pin fixed to one jaw and working in a hole in the other jaw which will back up a large hook held in the arcuate groove.

BRIEF DESCRIPTION OF THE DRAWINGS

FIG. 3 is a section on line 3—3 of FIG. 2;

FIG. 4 is a view in elevation of one of the jaws;

FIG. 5 is a diagram illustrating the action of the new vise;

FIG. 6 is a similar diagram illustrating the prior art; and

FIG. 7 is a view illustrating a hook and the points of pressure applied thereto by the vise.

PREFERRED EMBODIMENT OF THE INVENTION

A metal support or housing generally indicated at 10 is mounted in any way desired as on a pivot pin 12 in a stud 14 on the housing, the pin being mounted on a rod or tube 16 which, in turn, is mounted as desired.

Figure 2:
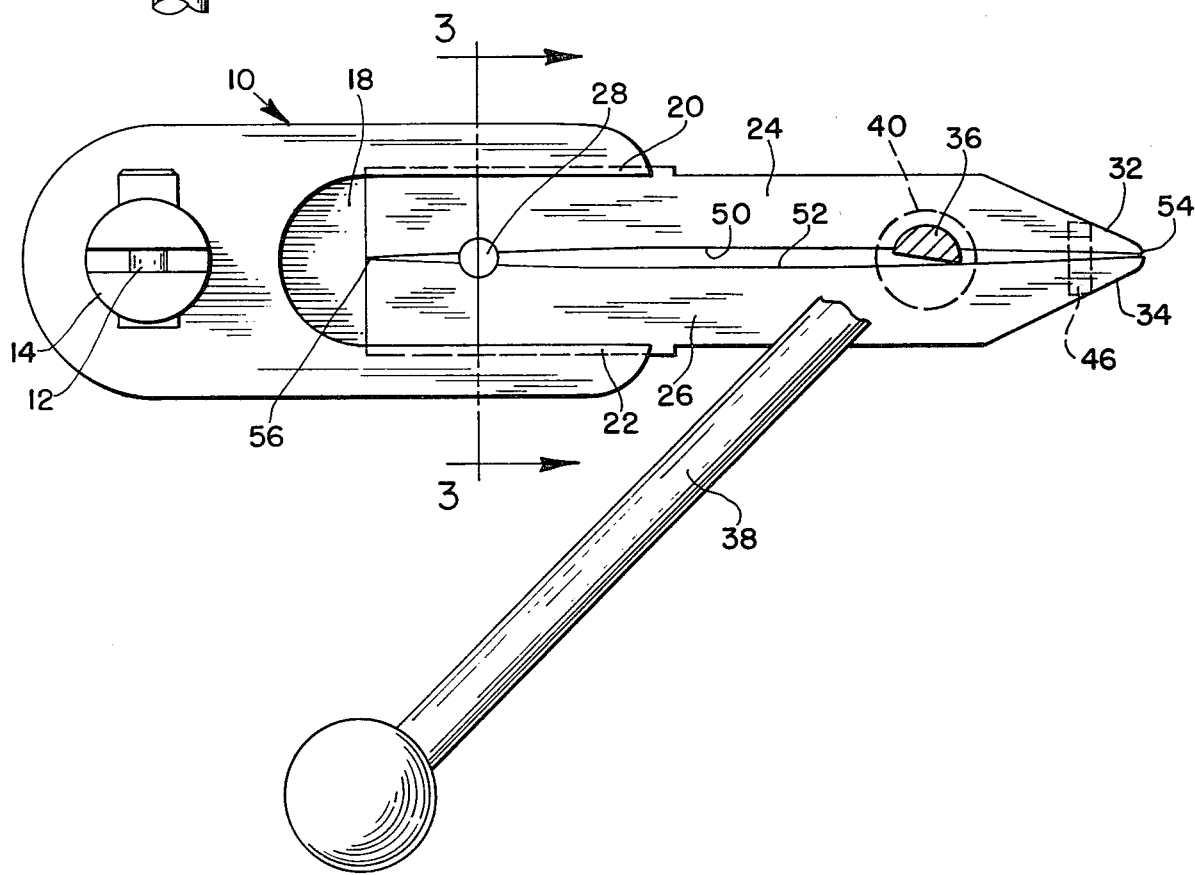
FIG. 2 is a bottom plan view thereof looking in the direction of arrow 2 in FIG. 1 on an enlarged scale.

Referring to FIGS. 2 and 3, it will be seen that the housing 10 is undercut towards one end thereof inwardly, forming a slot as is indicated by the reference to numeral 18. This slot is divided with parallel spaced inwardly directed lips 20, 22 which receive two hardened spring metal bars 24 and 26 which are arranged in a cooperative relation and are slid into the slot 18. A pin 28 is located in corresponding grooves in the bars towards the inner ends thereof, the pin 28 seating in a small recess 30, see FIG. 3, and the resilience of the bars 24 and 26 is such that they bear against the sidewalls of the groove 18 and each other, and due to the presence of pin 28, bars 24 and 26 cannot escape accidentally.

Figure 1:
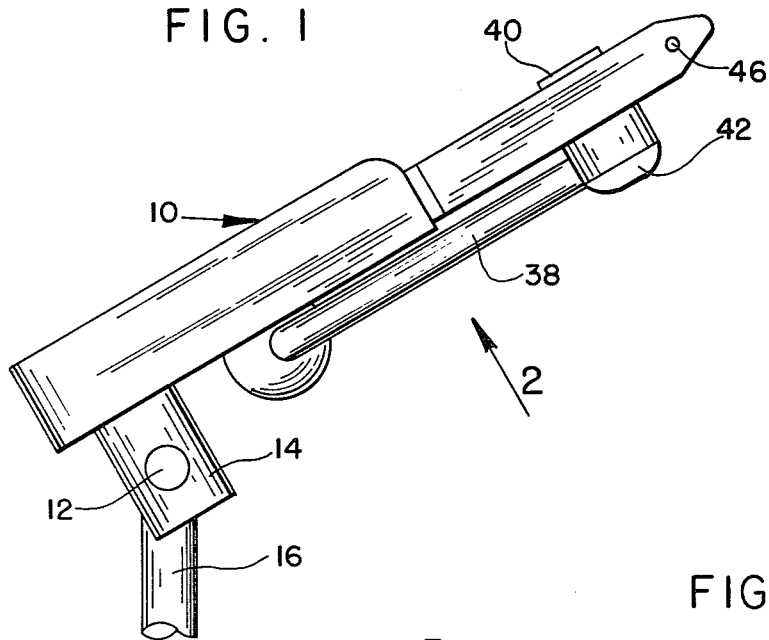
FIG. 1 is a view in side elevation illustrating device.

At their opposite ends, the bars terminate and are reduced forming hook holding jaws 32 and 34, these jaws being adapted to be spread apart against the inherent resiliency of the bars by means of a cam 36 operated by a handle 38. Looking at FIG. 2, it will be seen that it is merely necessary to squeeze bar 38 toward the bar 26 with one hand, whereupon cam 36 rotates in such as way as to separate the jaws 32, 34. The cam 36 is located in semi-cylindrical groove in jaw 34 and bears directly on jaw 26 being in a semi-cylindrical shape. Cam 36 is held in position by a rivet head or the like 40 located on top of the bars, see FIG. 1, and by a rivet head 42 below the bars.

In certain cases especially with larger hooks, it is preferred that an arcuate groove 44 be provided in one of the jaws, the other jaw being plain, and one of the jaws has a pin 46 fixed in it working in a guide hole opposite it in the other jaw.

The bars 24 and 26 are provided with concave edges which are indicated in FIG. 2 as at 50 and 52 and this causes the jaws to appear as in FIG. 5. That is, these jaws are closest together at the extreme end portions thereof as indicated at 54, see FIG. 5, and at 56, see FIG. 2. The jaws retreat from each other inwardly at the right hand side of the cam as shown in FIG. 2, and also further to the left hand side of the cam, before coming back together and impinging upon each other at the extreme inner end portions thereof 56. The arrangement is such that there is a pressure point between the jaws at 56 and also a pressure point at the cam. The extreme ends of the jaws at 54 are normally spaced apart about three thousandths of an inch, being spaced apart further the more the cam is turned in a clockwise direction, FIG. 2.

This construction ensures that the bend of the hook which is indicated at 58 in FIG. 5 is strongly held when the handle 38 of the cam is released but the hook is even more strongly held at forward portions from the bend in the areas indicated at 60 and 62, see FIG. 7, the bend being indicated at 58.

In comparison with the prior art, FIG. 6, where the jaws are normally arranged in contacting flat relation and the jaws 64 and 66 are separated by some means such as a cam or the like, the bend of the hook will be relatively firmly held as at 68 but forwardly of this bend as in the areas 70, 72 they would not be held as well and therefore of course the hook is much more apt to pivot up and down as the hook is being worked on to make a fly.

Very small hooks can be firmly held in advance of the arcuate groove 44 and larger hooks may be held using the arcuate groove to hold the same at the bend but the action is substantially the same and the pin 46 acts as an abutment which will contact the large hook which is in the groove 44 at the convex side of the bend of the hook, more firmly locating it in position. The groove 44 is not used with small hooks but at the same time it lends great versatility to the device by ensuring a greater range of sizes of hooks from extremely small to size 2 or the like and even this range is not limited because the vise may be made to accept almost any size of hook normally used for fly tying.

I claim:

1. A fly tier's vise comprising a support, a pair of bars, means mounting the bars on the support in side by side relation, the means mounting the bars including a housing, a slot in the housing, said bars being located and held together in contacting relation at corresponding ends in the housing, the opposite ends of the bars extending out of the slot and the housing, at least one of said bars having a concave surface facing the other bar, said bars being normally in contact at said opposite ends, the latter ends of the bars having hook clamping portions facing each other, said clamping portions gradually diverging inwardly of the bars from the extreme ends of the bars, and means to temporarily separate the hook clamping portions of the bars to accept the bend of a conventional fish hook, said bars being of a resilient material to inherently hold the fish hook when said temporarily separating means is inoperative.

2. The vise of claim 1 wherein both bars have facing concave surfaces.

3. The vise of claim 1 wherein the means to temporarily separate the hook clamping portions is a cam having a rotative motion and a handle to operate it.

4. The vise of claim 3 including a cam socket for the cam on one bar, said cam impinging on the other bar.

5. The vise of claim 4 wherein the cam normally holds the extreme ends of the hook clamping portion very slightly apart, the bars exerting pressure on the cam.

6. The vise of claim 4 wherein the handle for the cam extends generally radially from the cam at an angle to the bars, the handle being swung toward the bars to rotate the cam in a direction to spread the hook clamping portions of the bars to accept a hook.

7. The vise of claim 1 including aligned bores in the hook clamping area of the bars, a pin fast to a bar and in one bore and extending toward and into the bore in the other bar.

8. The vise of claim 1 wherein the bore diverge from the extreme ends thereof toward the central area of the bars.

9. A fly tier's vise comprising a support, a pair of bars, means mounting the bars on the support in side by side relation, at least one of said bars having a concave surface facing the other bar, said bars being substantially in contact at their ends, corresponding ends of the bars having hook clamping portions facing each other, said clamping portions gradually diverging inwardly of the bars from the extreme ends of the bars, and means to temporarily separate the hook clamping portions of the bars to accept the bend of a conventional fish hook, said bars being of a resilient material to inherently hold the fish hook when said means is inoperative, an arc shaped groove in at least one of the hook clamping portions, and a cross pin in the bars, the groove being concave facing the extreme ends of the hook clamping portions, and the pin being tangent to the groove at its convex side.

* * * * *